US009825966B2

(12) United States Patent
Khosravi et al.

(10) Patent No.: US 9,825,966 B2
(45) Date of Patent: Nov. 21, 2017

(54) SYSTEM PLATFORM FOR CONTEXT-BASED CONFIGURATION OF COMMUNICATION CHANNELS

(71) Applicant: Intel Corporation, Santa Clara, CA (US)

(72) Inventors: Hormuzd M. Khosravi, Portland, OR (US); Abhilasha Bhargav-Spantzel, Santa Clara, CA (US); Ulf Bjorkengren, Bjarred (SE)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/575,595

(22) Filed: Dec. 18, 2014

(65) Prior Publication Data

US 2016/0182524 A1 Jun. 23, 2016

(51) Int. Cl.
*H04L 29/06* (2006.01)
*G06F 21/60* (2013.01)
*H04L 12/24* (2006.01)
*H04L 12/54* (2013.01)

(52) U.S. Cl.
CPC ............ *H04L 63/105* (2013.01); *G06F 21/60* (2013.01); *H04L 12/5692* (2013.01); *H04L 41/0893* (2013.01); *H04L 63/04* (2013.01); *H04L 63/20* (2013.01); *H04L 41/0853* (2013.01)

(58) Field of Classification Search
CPC .................................. G06F 21/60; H04L 63/04
See application file for complete search history.

(56) References Cited

U.S. PATENT DOCUMENTS

| 5,793,842 A * | 8/1998 | Schloemer ............... H04B 7/26 370/332 |
| 2003/0108205 A1* | 6/2003 | Joyner ................. H04L 9/0618 380/277 |
| 2005/0141525 A1 | 6/2005 | Rose |

(Continued)

FOREIGN PATENT DOCUMENTS

WO 2015047338 A1 4/2015

OTHER PUBLICATIONS

Kopetz, "Real-Time Systems: Design Principles for Distributed Embedded Applications", 2011, Chapter 13, pp. 307-323.*

(Continued)

*Primary Examiner* — Thaddeus Plecha
(74) *Attorney, Agent, or Firm* — International IP Law Group, P.L.L.C.

(57) ABSTRACT

The techniques described herein include configuration of channels between devices and service providers at a connectable system platform. For example, a system platform may include a receiver to receive data from a communicatively coupled device. The system platform may include a controller having logic, at least partially comprising hardware logic, to configure communications channels. The communication channels include a communication channel for transmission between the system platform and a service provider to receive the data, and a communication channel for transmission between the system platform and the coupled device. The communication channels are configured based on a context. The context comprises characteristics of the coupled device, content of the data, and security requirements associated with the service provider.

18 Claims, 6 Drawing Sheets

(56) References Cited

U.S. PATENT DOCUMENTS

| | | | | |
|---|---|---|---|---|
| 2008/0109912 | A1* | 5/2008 | Rivera | H04L 63/20 726/30 |
| 2008/0134309 | A1* | 6/2008 | Qin | G06F 21/105 726/6 |
| 2010/0248646 | A1* | 9/2010 | Yamazaki | H04W 52/0277 455/73 |
| 2010/0272031 | A1 | 10/2010 | Grayson et al. | |
| 2011/0058508 | A1 | 3/2011 | Nordin et al. | |
| 2011/0207407 | A1* | 8/2011 | Kim | H04L 12/14 455/41.2 |
| 2012/0011360 | A1* | 1/2012 | Engels | H04L 9/006 713/166 |
| 2012/0028670 | A1* | 2/2012 | Lim | H04W 52/0261 455/522 |
| 2013/0041997 | A1 | 2/2013 | Li et al. | |
| 2013/0308470 | A1* | 11/2013 | Bevan | H04W 64/00 370/252 |
| 2014/0047322 | A1 | 2/2014 | Kim et al. | |
| 2014/0114675 | A1* | 4/2014 | Soon-Shiong | G06F 19/322 705/2 |
| 2014/0159913 | A1* | 6/2014 | Shaw | H04Q 9/00 340/870.02 |
| 2014/0237123 | A1* | 8/2014 | Dave | H04L 65/1069 709/227 |
| 2014/0325594 | A1* | 10/2014 | Klein | H04L 63/08 726/2 |
| 2015/0026334 | A1* | 1/2015 | Choi | H04L 67/10 709/224 |
| 2015/0382434 | A1* | 12/2015 | Noesner | H05B 37/0272 315/131 |

OTHER PUBLICATIONS

Smith, et al., "Near Field Communication Authentication Mechanism", WO Patent Application No. PCT/US2013/074623, filed on Dec. 12, 2013, pp. 1-43.

Bhargav-Spantzel, et al., "Context-Aware Proactive Threat Management System", WO Patent Application No. PCT/US2013/070858 filed on Nov. 19, 2013, pp. 1-30.

Ballesteros, et al., "System and method to do secure e-Commerce with TV and Radio", Utility U.S. Appl. 14/582,970, filed on Dec. 24, 2014.

Bhargav-Spantzel, et al., "Method and Apparatus for Multi-Level User Centric Device Pairing", Utility U.S. Appl. No. 14/472,645, filed on Aug. 29, 2014.

Bhargav-Spantzel, et al., "Methods and Apparatus for Group Context Aware Proactive Threat Management and Visualization", Utility U.S. Appl. No. 14/359,969, filed on Nov. 19, 2013.

Bhargav-Spantzel, et al., "Methods and Apparatus for Group Context Aware Proactive Threat Management and Visualization", WO Patent Application No. PCT/US2013/070858 filed on Nov. 19, 2013.

Khosravi, et al., "Method and Apparatus for Context Aware Trusted Computing Base", Utility U.S. Appl. No. 14/581,309, filed on Dec. 23, 2014.

Smith, et al., "Context-based access control of a cloud resource", Utility U.S. Appl. No. 14/129,961, filed on Sep. 27, 2013.

Smith, et al., "Context-based access control of a cloud resource", WO Patent Application No. PCT/US2013/062435, filed on Sep. 27, 2013.

Smith, et al., "Context-based Remote Attestation", Utility U.S. Appl. No. 14/361,877, filed on Dec. 12, 2013.

Smith, et al., "Context-based Remote Attestation", WO Patent Application No. PCT/US2013/074623, filed on Dec. 12, 2013.

Smith, et al., "Method and Apparatus for Context aware data classification and protection", Utility U.S. Appl. No. 14/628,016, filed on Feb. 20, 2015.

International Search Report, PCT No. PCT/US2015/053952, mailed on Mar. 2, 2016, 4 pages.

* cited by examiner

SYSTEM PLATFORM FOR CONTEXT-BASED CONFIGURATION OF COMMUNICATION CHANNELS

TECHNICAL FIELD

The present techniques relate generally to a system platform for communicatively coupled devices. More specifically, the present techniques relate to a hub that is configured to a system platform that may configure communications channels based on context.

BACKGROUND

With billions of networked devices connected as part of an Internet of things (IoT), further development may rely on data been generated by these devices. Increased productivity may be based on the analysis of the collected data to meaningful information. Such analysis may be done by other networked devices (e.g., P2P mesh), backend cloud services, or local backend services. This may require transparent and robust connections between any given device and the intended recipient. Security and privacy issues concerning this massive collection and transfer of data are indicated as well.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, as networked devices become connected as a part of an Internet of Things (IoT), connections from each of these devices to backend service providers may be impeded by various contexts associated with a given networked device, the backend service provider, and the like. For example, power available at an internet connected wearable device may be at level reducing the capability of the device to transmit data to the service provider. In other cases, a service provider may require that certain security protocols may be met that are beyond the protocols available to the networked device. For example, a networked home appliance may not contain a processing power capability, or protocol programming required to communicate with various service providers.

The techniques described herein include a system platform that may enable devices in a networked domain to communicate with the system platform as a hub. The system platform may configure communications channels including a communication channel for transmission between the system platform and service providers. The system may also configure communications channels including a communication channel between the system platform and a device in the networked domain. In many cases, the service provider may be a remote service provider and the domain may be a local area network. However, in some cases, the system platform may be configured to configure communications channels to a service provider, such as a home automation system. In any case, networked devices may communicate with service providers via the system platform even given various contexts including characteristics of a coupled device within a given local domain, content of the data being provided, and security requirements associated with the service provider. Additional aspects are discussed in more detail below.

Figure 1:
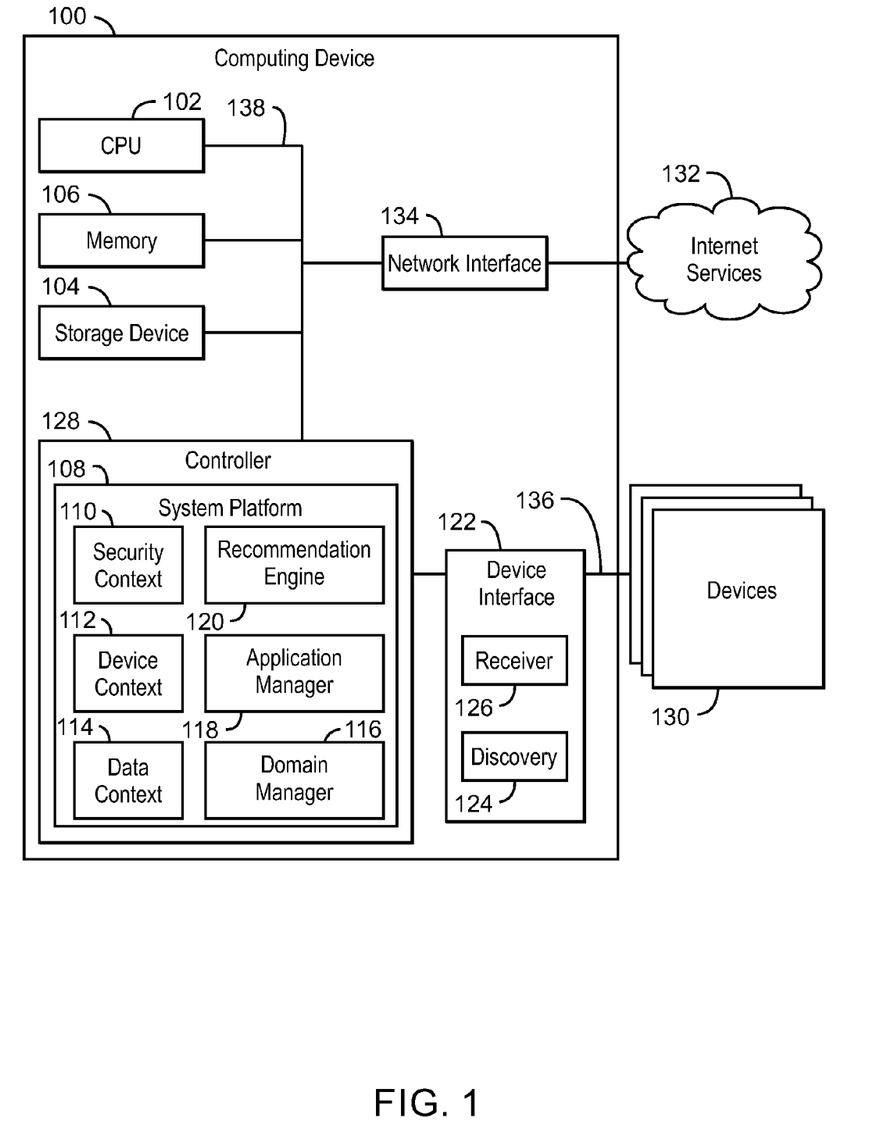
FIG. 1 is a block diagram illustrating a computing device configured to configure communications channels between networked devices in a local domain and service providers.

FIG. 1 is a block diagram illustrating a computing device configured to configure communications channels between networked devices in a local domain and service providers. The computing device 100 may be, for example, a laptop computer, desktop computer, ultrabook, tablet computer, mobile device, or server, among others. The computing device 100 may include a processing device 102 that is configured to execute stored instructions, as well as a storage device 104 including a non-transitory computer-readable medium, and a memory device 106.

The computing device may include various modules including a system platform 108 receiving contexts including security context 110, device context 112, and data context 114. Other contexts may be considered. Other modules may include a domain manager 116, an application manager 118, and a recommendation engine 120. A device interface 122 may include a discovery module 124 and a receiver 126. The modules including the system platform 108, as well as the domain manager 116, application manager 118, recommendation engine 120, the discovery module 124 may be implemented as discrete modules in some cases. In some cases, the modules 108, 116, 118, 120, 124, and any other modules may be implemented as functionalities of a controller 128. In some cases, the controller 128 may be implemented as logic, at least partially comprising hardware logic, as electronic logic, at least partially comprising hardware logic, to be carried out by electronic circuitry, circuitry to be carried out by an integrated circuit, and the like. In some cases, the controller 128 may be implemented a portion of software instructions to be carried out by a processing device, such as the CPU 102. The modules of the controller 128 may be configured to operate independently, in parallel, distributed, or as a part of a broader process. In yet other cases, the modules of the controller 128 may be implemented as a combination of software, firmware, hardware logic, and the like.

As discussed above, a domain of networked devices 130 may be communicatively coupled to the computing device 100. The networked devices 130 may each have various capabilities, conditions, may be configured to gather various data, while internet services 132 coupled to a network interface 134 may require various security protocols to receive data from the networked devices 130. The networked devices 130 may be communicatively coupled to the computing device 100 via a local area network, as indicated at 136. A local area network is a computer network interconnecting computers within a limited area such as a home, school, computer laboratory, or office building, using network media. The system platform 108 may be referred to as a hub between networked devices 130 in a local domain and service providers 132. The system platform 108 may configure communications channels between the system platform and internet services 132 to receive data gathered from the devices 130 within the domain based on security contexts 110 such as requirements of a given internet service 132, or concurrent data contexts 114, as well as device contexts 112 including capacities and resources of a given device 130. The system platform 108 may also configure communication channels between the devices 130 and the computing device 100 based on device context 112 including communication capabilities, device resources at the devices 130, signal strengths, bandwidth availability, communication protocols and the like, as well as security contexts 110 and data contexts 114.

The domain manager 116 is configured to maintain addresses of devices 130 within the local domain, store preferred communication protocols to communicate with each the coupled devices 130, configure the coupled devices 130, report any errors in the domain, or any combination thereof. The application manager 118 may be configured to provide a local execution environment to one or more of the service providers 132. A local execution environment may enable development of specific use-case applications for the system platform 108 and the coupled devices 130. The recommendation engine 120 may be configured to generate communication channel recommendations to be provided to one or more of the internet service providers 132, the devices 130, or any combination thereof.

The memory device 104 can include random access memory (RAM), read only memory (ROM), flash memory, or any other suitable memory systems. For example, the memory device 106 may include dynamic random access memory (DRAM). The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems.

The processing device 102 may be a main processor that is adapted to execute the stored instructions. The processing device 102 may be a single core processor, a multi-core processor, a computing cluster, or any number of other configurations. The processing device 102 may be implemented as Complex Instruction Set Computer (CISC) or Reduced Instruction Set Computer (RISC) processors, x86 Instruction set compatible processors, multi-core, or any other microprocessor or central processing unit (CPU). The processing device 102 may be connected through a system bus 138 (e.g., Peripheral Component Interconnect (PCI), Industry Standard Architecture (ISA), PCI-Express, HyperTransport®, NuBus, etc.) to components including the memory 106 and the storage device 104. The processing device 102 may also be linked through the bus 138 to the controller 128 configured to provide an interface between the system platform 128, networked devices 130 and the internet services 132.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
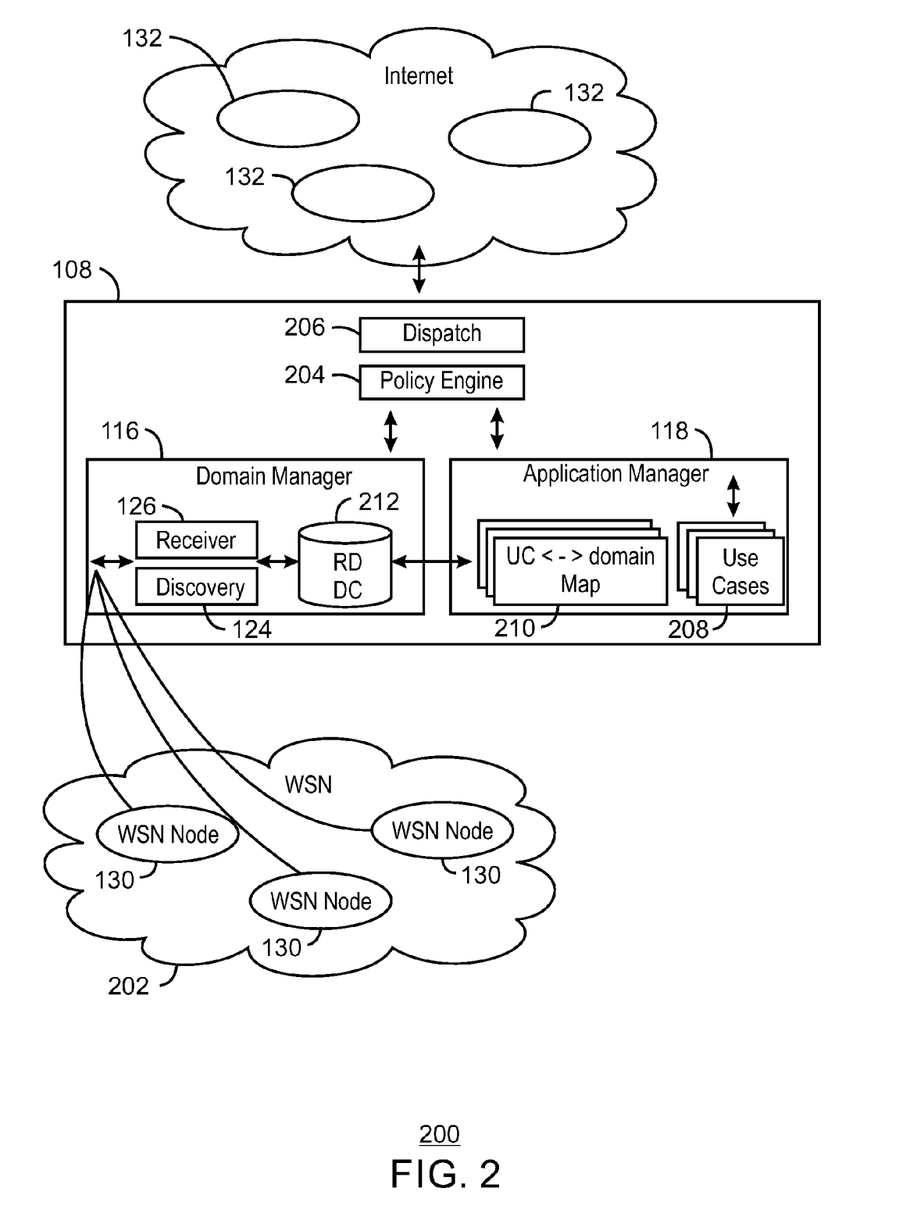
FIG. 2 is block diagram illustrating components of a system platform communicatively coupled to networked devices in a local domain.

FIG. 2 is block diagram illustrating components of a system platform communicatively coupled to networked devices in a local domain. As discussed above, the system platform 108 may be used as a hub for configuring communications between service providers 132 and devices 130 of a local domain 202. The system platform 108 may be configured to discover devices 130 of the local domain 202 via a discovery module, such as the discovery module 124 of FIG. 1. The discovery module 124 may leverage communications technologies of the receiver 126. The communications technologies may include Bluetooth, Bluetooth Low Energy (BLE), Message Queue Telemetry Transport (MQTT) protocols, and the like. Once one or more of the devices 130 are discovered, the receiver 126 may establish trust by pairing to the device such that outgoing data traffic may be received from the devices 130.

Traffic channeled through the system platform 108 may be analyzed by a policy engine 204. In some cases, the policy engine 204 may be a component of the controller 128 of FIG. 1. The policy engine 204 may determine how traffic should be encapsulated for a secure channel to one or more of the service providers 132. In some cases, policies may be configured by an enterprise information technology system that owns or operates the system platform 108, by an original equipment manufacturer (OEM) having default policies, or any combination thereof. A secure channel is then established using a dispatcher 206. In some cases, the dispatcher 206 may be running in an operating system of the computing device 100 of FIG. 1. The dispatcher 206 may interface with various protocols associated with any given service provider 132. For example, the dispatcher 206 may be configured to interface with a virtual private network (VPN) protocol, a cloud security as a service (SAAS) system, as well as basic network drivers. In any case, the dispatcher 206 may be configured to route traffic based on the content of the data, an indication of context-based policy of the policy engine 204, or any combination thereof. As discussed above, in regard to FIG. 1, recommendations may also be routed to service providers evaluated in view of backend service provider specifics, such as SAAS requirements, or based on local policies of a local service provider. The recommendations may also be conveyed back to the devices 130 within the local domain 202. For example, a recommendation may include which channel to use among a selection of channels, a communications protocol to use, a security protocol to use, and the like.

As discussed above in regard to FIG. 1, the application manager 118 may be configured to provide backend services a local execution environment, which may serve to simplify development of specific use-cases 208. A mapping 210 of device references as used in use cases 208 to the devices 130 within the domain 202 may be provided from a resource directory and data cache (RDDC) 212 configured to store data associated with the devices 130 within the domain 202. In some cases, the mapping 210 points to data in the RDDC 212 that may be simulated for development of applications, and/or specific use cases.

Figure 3:
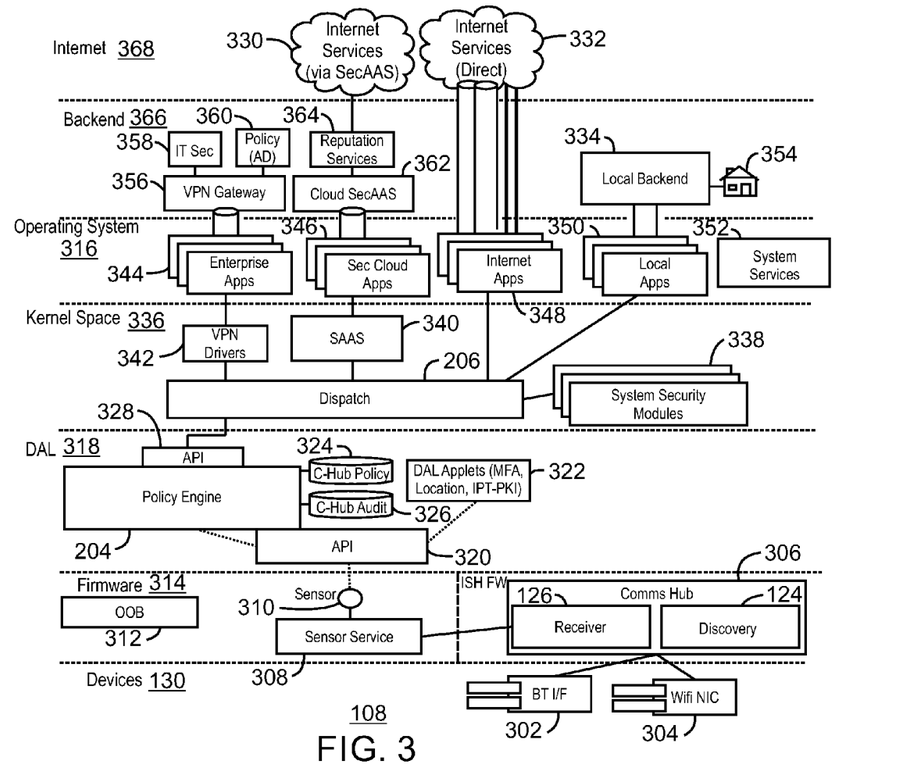
FIG. 3 is an abstraction layer diagram of a system platform communicatively coupled to service providers.

FIG. 3 is an abstraction layer diagram of a system platform communicatively coupled to service providers. The system platform 108 of FIG. 1 may include various abstraction layers. In FIG. 3, devices 130 may include relatively simple sensors, or may include more sophisticated devices within the device domain 202. The devices 130 may include one or more communication interfaces including Bluetooth interfaces 302, Wireless Fidelity (WiFi) interfaces 304, and the like configured to be received at a communications hub 306 including the receiver 126 and the discovery module 124 discussed above in regard to FIGS. 1 and 2. In some cases, a sensor service 308 and a sensor 310 may detect incoming data traffic as illustrated in FIG. 3. Further, in some cases, out of band (OOB) 312 operations may be included in a firmware layer 314 of the system platform 108. The OOB 312 operations may be active management technology capable connect to the system platform 108 without depending on operation of an operating system layer 316 discussed in more detail below.

Application loads may be handled in a dynamic application load (DAL) layer 318 through an application programming interface (API) 320 between the firmware layer 314 and the DAL layer 318. In some cases, DAL applets 322 may be used to handle loads for specific types of contexts. The policy engine 204 may reference hub policies 324. In some cases, the policy engine 204 may reference a data store for hub audits 326. Hub audit data in the data store for hub audits 326 may include dynamically changing data about devices in a given domain, such as the domain 202 of FIG. 2.

An API 328 may provide communication channel configuration instructions to the dispatcher 206. The instructions may be based on the various contexts of the devices 130, the data being transmitted, as well as security requirements of the services 132, including remote services 330 and 332, as well as local backend services 334 illustrated in FIG. 3. In some cases, the instructions for channel configuration may create separate secure channels between various devices 130. For example, one the devices 130 may provide data having sensitive data content level in relationship to data provided from another of the devices 130. In this scenario, the instructions may configure communications channels to various service providers 330, 332, and 334.

The dispatcher 206 may be a component in a kernel layer 336 of abstraction of the system platform 108. The kernel layer 336 may also include system security modules 338 that may use information from the policy engine 204, and the policy data store 324, as well as the audit data store 326.

As discussed above in regard to FIG. 2, the dispatcher 206 may be configured to package the data to be transmitted based on various channel requirements. For example, the dispatcher 206 may provide data to SAAS drivers 340, to VPN drivers 342, before providing data to applications including enterprise applications 344, secure cloud applications 346, and the like. Applications such as the enterprise applications 344, secure cloud applications 346, as well as internet applications 348, local applications 350, system services 352, and the like, are illustrated as components of the operating system layer 316. Local applications 350 may include thermostat applications running at a local backend service, such as a home automation service associated with a residence 354. The local backend 352, as well as one or more VPN gateways 356 connected to VPN specific infrastructure security features 358 and policies 360, cloud SAAS 362 backend services connected to reputation services 364 may be components of a backend layer 366.

As illustrated in FIG. 3, secure cloud apps 346 may be connected to internet SAAS services 330, while internet apps 348 may be connected to internet services 332 in an internet abstraction layer 368. In some cases, backend layer 366 internet layer 368 and device layer 130, are not considered components of the system platform 108, but may be provided for illustrative purposes. As illustrated in FIG. 3, the system platform 108 may connect a plurality of devices 103 to various services through various communication channel configurations.

Figure 4:
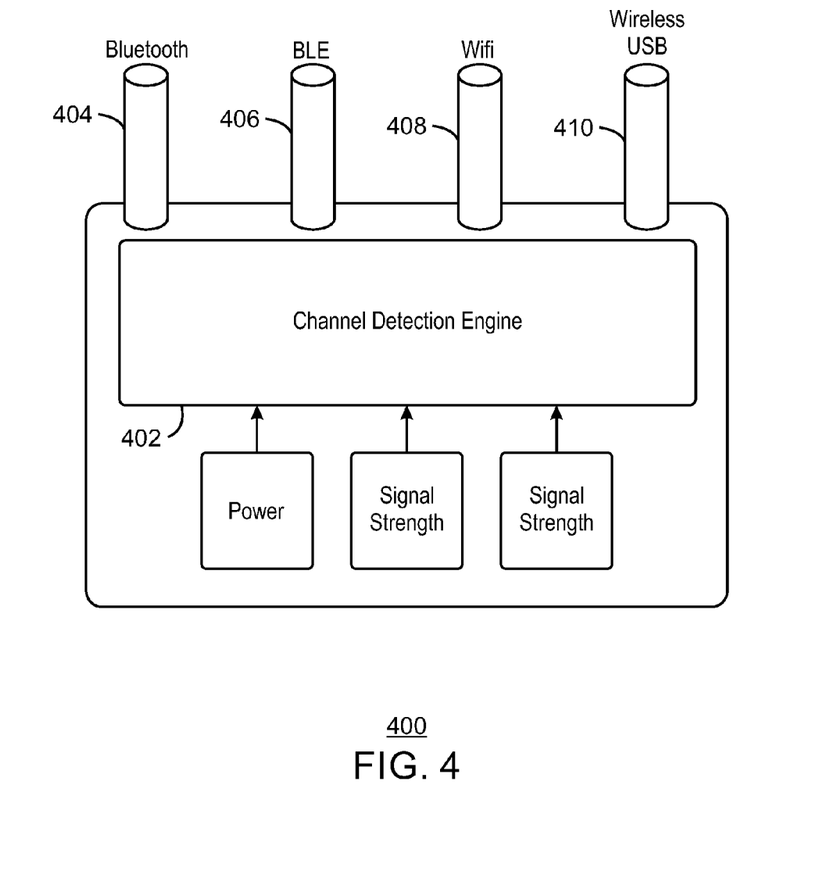
FIG. 4 is a diagram illustrating a channel detection engine.

FIG. 4 is a diagram illustrating a channel detection engine. As mentioned above, a controller, such as the controller 128 of FIG. 1, may be configure channels between devices 130 and the system platform 108. In some cases, the configuration may be based on security needs in relation to backend services. In some cases, the configuration may be based on security needs in view of the content being transmitted as determined by the policy engine 206. In some cases, the configuration may be based on context such as signal strength between a given device 130 and the system platform. In some cases, the configuration is based on any combination thereof.

As illustrated in FIG. 4, the system platform 108 may include a channel detection engine 402. The channel detection engine 402 may monitor contexts such as device characteristics including power, signal strength, security, and the like that are available at a given device. In some cases, the characteristics are temporal such as with a power level that may dynamically change. The channel detection engine 402 may select from among one or more channels, such as a Bluetooth channel 404, a BLE channel 406, a WiFi channel 408, a wireless Universal Serial Bus (USB) channel 410, and the like based on the various contexts detected. The channel detection engine 402 may determine the best channel to use, may determine an optimal protocol to communicate based on policies of the policy engine 204 as well capacities of a given device of the devices 130.

For example, if a given device 130 is low on power, the channel detection engine 402 may direct the system platform 108 to configure the communications channel from the system platform 108 to the device 130 to use BLE rather than a more power hungry WiFi channel. As another example, if radio frequency interference were above a given threshold, the system platform 108 may determine to use wireless USB based on detections from the channel detection engine 402. Additional security measures may be taken by the channel detection engine 402 if a security policy dictates the use of a given communication channel of the device 130 based on sensors available to that device 130, such as location, data content, and the like.

Figure 5:
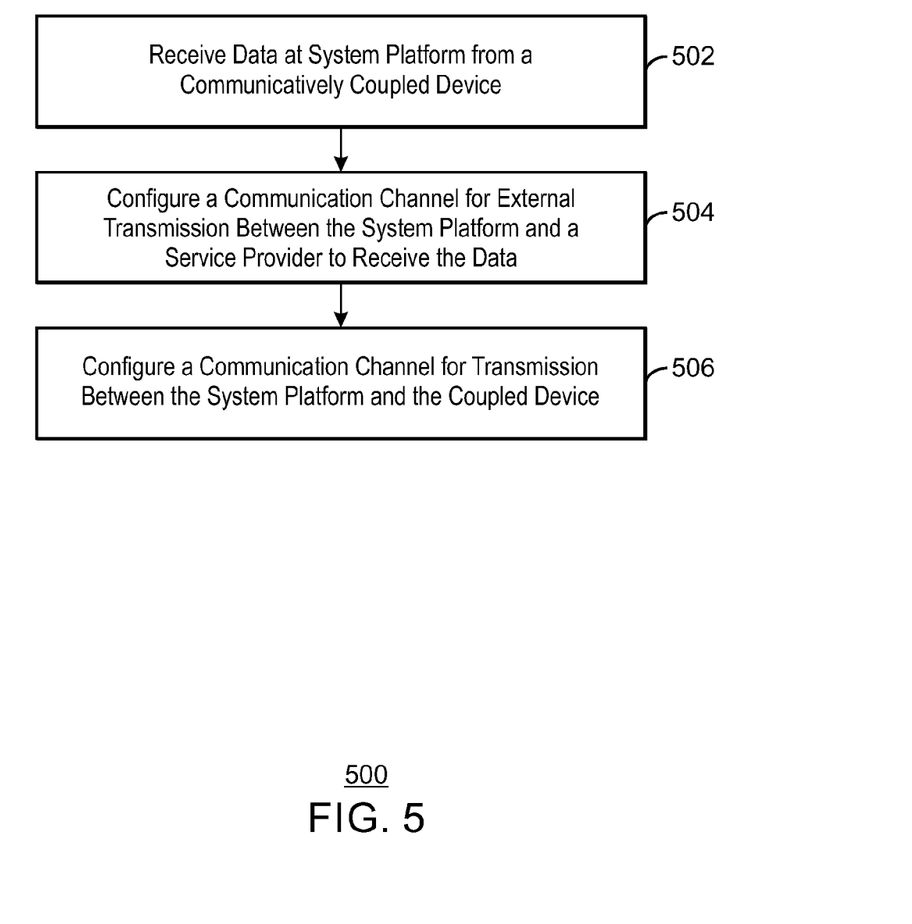
FIG. 5 is a process flow diagram showing a method for channel configuration.

FIG. 5 is a process flow diagram showing a method for channel configuration. The method 500 may include receiving data at system platform from a communicatively coupled device, at block 502. At block 504, the method includes configuring a communication channel for transmission between the system platform and a service provider to receive the data. At block 506, the method 500 includes configuring a communication channel for transmission between the system platform and the coupled device. The communication channels are configured based on a context including characteristics of the coupled device, content of the data, and security requirements associated with the service provider.

The system platform in the method 500 may be a hub platform. The communicatively coupled device may be one of a plurality of communicatively coupled devices communicatively coupled to the hub platform in a local area network domain. In some cases, the method 500 may include maintaining addresses identifying the coupled devices in the domain, storing preferred communication protocols to communicate with each the coupled devices, configuring the coupled devices, reporting errors in the domain, or any combination thereof.

In some cases, the configuration of the communication channels is based on a reference to a policy engine. Further, the communication channel for external transmission between the system platform and a service provider to receive the data requires a security level that is higher than a security level capability of the communicatively coupled device.

The characteristics of the coupled device may include capabilities of the coupled device, data indicating a temporal condition of the coupled device, or any combination thereof. The configuring the communication channel for transmission between the system platform and the coupled device may include determining a communication channel based on the capabilities of the coupled device as well as the data indicating the temporal condition of the coupled device. Data indicating a temporal condition of the coupled device may include power availability of the coupled device, a current expected latency of the coupled device, or any combination thereof.

In some cases, the method 500 includes providing a local execution environment to the service provider via an application manager of the system platform. In some cases, the method 500 includes generating communication channel configuration recommendations to be provided to the service provider, the communicatively coupled device, or any combination thereof.

Figure 6:
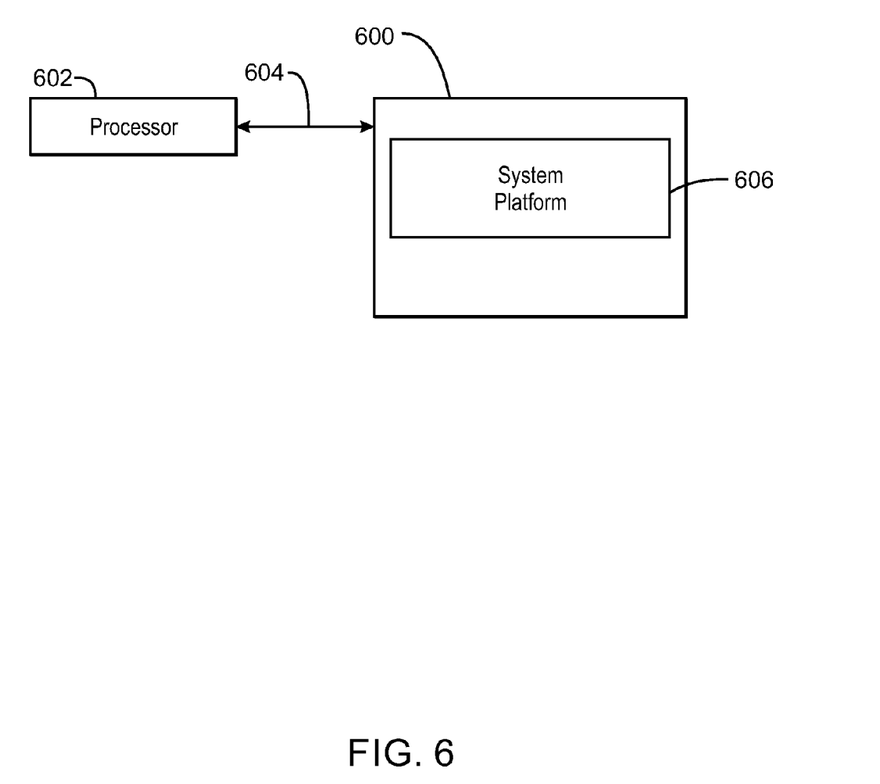
FIG. 6 is a block diagram illustrating a machine-readable medium configured to configure communication channels based on context according to embodiments described herein.

FIG. 6 is a block diagram illustrating a machine-readable medium configured to configure communication channels based on context according to embodiments described herein. The machine-readable medium 600 may be accessed by a processor 602 over a computer bus 604. In some examples, the machine-readable medium 600 may be a tangible, non-transitory, machine-readable medium. In some examples, the machine-readable medium 600 may be a storage medium, but not including carrier waves, signals, and the like. Furthermore, the machine-readable medium 600 may include machine-executable instructions to direct the processor 602 to perform the current method.

The various software components discussed herein may be stored on the machine-readable medium 600, as indicated in FIG. 6. For example, a system platform 606 may be configured to receive data at system platform from a communicatively coupled device, configure communications channels including a communication channel for transmission between the system platform and a service provider to receive the data, and a communication channel for transmission between the system platform and the coupled device. The communication channels are configured based on a context. The context includes characteristics of the coupled device, content of the data, and security requirements associated with the service provider.

The block diagram of FIG. 6 is not intended to indicate that the machine-readable medium 600 is to include all of the components shown in FIG. 6. Further, the machine-readable medium 600 may include any number of additional components not shown in FIG. 6, depending on the details of the specific implementation.

Examples may include subject matter such as systems and methods that configure communication channels between service providers and IoT devices. The IoT devices can include wearable devices, networked devices of home appliances, devices related to lighting at in a domain, temperature in a domain, and the like.

Example 1 includes a system platform. The system platform includes a receiver to receive data from a communicatively coupled device. The system platform also includes a controller having logic, at least partially comprising hardware logic, to configure communications channels including a communication channel for transmission between the system platform and a service provider to receive the data, and a communication channel for transmission between the system platform and the coupled device. The communication channels are configured based on a context including characteristics of the coupled device, content of the data, and security requirements associated with the service provider.

Example 1 may include any combination of the cases described below in association with Example 1. In some cases, the system platform comprises a hub platform, and wherein the communicatively coupled device is one of a plurality of communicatively coupled devices communicatively coupled to the hub platform in a local area network domain. The system platform may further include a domain manager configured to maintain addresses identifying the coupled devices in the domain, store preferred communication protocols to communicate with each the coupled devices, configure the coupled devices, report errors in the domain, or any combination thereof.

In some cases, the system platform may include a policy engine. The configuration of the communication channels is based on a reference to the policy engine. In some cases, the system platform is configured to interface with the service provider at a security level higher than a security level capability of the communicatively coupled device. In some cases, the characteristics of the coupled device include capabilities of the coupled device, data indicating a temporal condition of the coupled device, or any combination thereof. In this scenario, the system platform may further include a channel detection engine configured to determine a communication channel to communicate with the communicatively coupled device based on the capabilities of the coupled device as well as the data indicating the temporal condition of the coupled device. Further, in some cases, the data indicating a temporal condition of the coupled device includes, power availability of the coupled device, a current expected latency of the coupled device, any combination thereof.

In some cases, the system platform includes an application manager configured to provide a local execution environment to the service provider. A logical reference to a device from a use case running in the execution environment is mapped to a reference containing data from a coupled device, simulated data, or any combination thereof.

In some cases, the system platform further includes a recommendation engine to generate communication channel configuration recommendations. The recommendations may be provided to the service provider, the communicatively coupled device.

Example 2 includes a method for configuration of communication channels. The method may include receiving data at system platform from a communicatively coupled device, and configuring communications channels. The communications channels include a communication channel for transmission between the system platform and a service provider to receive the data, and a communication channel for transmission between the system platform and the coupled device. The communication channels are configured based on a context. The context includes characteristics of the coupled device, content of the data, and security requirements associated with the service provider.

Example 2 may include any combination of the cases described below in association with Example 2. In some cases, the system platform comprises a hub platform, and wherein the communicatively coupled device is one of a plurality of communicatively coupled devices communicatively coupled to the hub platform in a local area network domain. The method may further include maintaining addresses identifying the coupled devices in the domain, storing preferred communication protocols to communicate with each the coupled devices, configuring the coupled devices, reporting errors in the domain, or any combination thereof.

In some cases, the configuration of the communication channels is based on a reference to a policy engine. In some cases, the communication channel for transmission between the system platform and a service provider to receive the data requires a security level that is higher than a security level capability of the communicatively coupled device.

In some cases, the characteristics of the coupled device include capabilities of the coupled device, data indicating a temporal condition of the coupled device, or any combination thereof. In this scenario, configuring the communication channel for transmission between the system platform and the coupled device comprises determining a communication channel based on the capabilities of the coupled device as well as the data indicating the temporal condition of the coupled device. Further, in some cases, the data indicating a temporal condition of the coupled device includes, power availability of the coupled device, a current expected latency of the coupled device, any combination thereof.

In some cases, the method may include providing a local execution environment to the service provider via an application manager of the system platform. In some cases, the method may include generating communication channel configuration recommendations. The recommendations may be provided to the service provider, the communicatively coupled device, or any combination thereof.

Example 3 includes tangible, non-transitory, machine-readable storage medium. The tangible, non-transitory, machine-readable storage medium may include code to direct a processor to receive data at system platform from a communicatively coupled device, and configure communications channels. The communication channels include a communication channel for transmission between the system platform and a service provider to receive the data, and a communication channel for transmission between the system platform and the coupled device. The communication channels are configured based on a context. The context includes characteristics of the coupled device, content of the data, and security requirements associated with the service provider.

Example 3 may include any combination of the cases described below in association with Example 3. In some cases, the system platform configured as a hub, and the communicatively coupled device is one of a plurality of communicatively coupled devices communicatively coupled to the hub in a local area network domain.

In some cases, the tangible, non-transitory, machine-readable storage medium may include code to direct a processor to maintain addresses identifying the coupled devices in the domain, store preferred communication protocols to communicate with each the coupled devices, configure the coupled devices, report errors in the domain, or any combination thereof. In some cases, the tangible, non-transitory, machine-readable storage medium may include code to direct a processor to reference a policy engine, wherein the configuration of the communication channels is based on the reference to the policy engine. In some cases, the tangible, non-transitory, machine-readable storage medium may include code of the system platform configured to interface with the service provider at a security level higher than a security level capability of the communicatively coupled device. In some cases, the characteristics of the coupled device include capabilities of the coupled device, data indicating a temporal condition of the coupled device, or any combination thereof. In some cases, configuring the communication channel for transmission between the system platform and the coupled device includes determining a communication channel based on the capabilities of the coupled device as well as the data indicating the temporal condition of the coupled device.

In some cases, the data indicating a temporal condition of the coupled device includes power availability of the coupled device, a current expected latency of the coupled device, or any combination thereof. In some cases, the tangible, non-transitory, machine-readable storage medium may include code of an application manager configured to provide a local execution environment to the service provider, wherein a logical reference to a device from a use case running in the execution environment is mapped to a reference containing data from a coupled device, simulated data, or any combination thereof.

In some cases, the tangible, non-transitory, machine-readable storage medium may include code of a recommendation engine. The recommendation engine may be configured to generate communication channel configuration recommendations to be provided to the service provider, the communicatively coupled device, or any combination thereof.

Example 4 includes a system platform. The system platform includes a receiver to receive data from a communicatively coupled device. The system platform also includes a means to configure communications channels including a communication channel for transmission between the system platform and a service provider to receive the data, and a communication channel for transmission between the system platform and the coupled device. The communication channels are configured based on a context including characteristics of the coupled device, content of the data, and security requirements associated with the service provider.

Example 4 may include any combination of the cases described below in association with Example 4. In some cases, the system platform comprises a hub platform, and wherein the communicatively coupled device is one of a plurality of communicatively coupled devices communicatively coupled to the hub platform in a local area network domain. The system platform may further include a domain manager configured to maintain addresses identifying the coupled devices in the domain, store preferred communication protocols to communicate with each the coupled devices, configure the coupled devices, report errors in the domain, or any combination thereof.

In some cases, the system platform may include a policy engine. The configuration of the communication channels is based on a reference to the policy engine. In some cases, the system platform is configured to interface with the service provider at a security level higher than a security level capability of the communicatively coupled device. In some cases, the characteristics of the coupled device include capabilities of the coupled device, data indicating a temporal condition of the coupled device, or any combination thereof. In this scenario, the system platform may further include a channel detection engine configured to determine a communication channel to communicate with the communicatively coupled device based on the capabilities of the coupled device as well as the data indicating the temporal condition of the coupled device. Further, in some cases, the data indicating a temporal condition of the coupled device includes, power availability of the coupled device, a current expected latency of the coupled device, any combination thereof.

In some cases, the system platform includes an application manager configured to provide a local execution environment to the service provider. A logical reference to a device from a use case running in the execution environment is mapped to a reference containing data from a coupled device, simulated data, or any combination thereof.

In some cases, the system platform further includes a recommendation engine to generate communication channel configuration recommendations. The recommendations may be provided to the service provider, the communicatively coupled device.

Example 5 includes an apparatus having a system platform. The system platform includes a receiver to receive data from a communicatively coupled device. The apparatus also includes a means to configure communications channels including a communication channel for transmission between the system platform and a service provider to receive the data, and a communication channel for transmission between the system platform and the coupled device. The communication channels are configured based on a context including characteristics of the coupled device, content of the data, and security requirements associated with the service provider.

Example 5 may include any combination of the cases described below in association with Example 5. In some cases, the system platform comprises a hub platform, and wherein the communicatively coupled device is one of a plurality of communicatively coupled devices communicatively coupled to the hub platform in a local area network domain. The system platform may further include a domain manager configured to maintain addresses identifying the coupled devices in the domain, store preferred communication protocols to communicate with each the coupled devices, configure the coupled devices, report errors in the domain, or any combination thereof.

In some cases, the system platform may include a policy engine. The configuration of the communication channels is based on a reference to the policy engine. In some cases, the system platform is configured to interface with the service provider at a security level higher than a security level capability of the communicatively coupled device. In some cases, the characteristics of the coupled device include capabilities of the coupled device, data indicating a temporal condition of the coupled device, or any combination thereof. In this scenario, the system platform may further include a channel detection engine configured to determine a communication channel to communicate with the communicatively coupled device based on the capabilities of the coupled device as well as the data indicating the temporal condition of the coupled device. Further, in some cases, the data indicating a temporal condition of the coupled device includes, power availability of the coupled device, a current expected latency of the coupled device, any combination thereof.

In some cases, the system platform includes an application manager configured to provide a local execution environment to the service provider. A logical reference to a device from a use case running in the execution environment is mapped to a reference containing data from a coupled device, simulated data, or any combination thereof.

In some cases, the system platform further includes a recommendation engine to generate communication channel configuration recommendations. The recommendations may be provided to the service provider, the communicatively coupled device.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A "module" as used herein refers to any combination of hardware, software, and/or firmware. As an example, a module includes hardware, such as a micro-controller, associated with a non-transitory medium to store code adapted to be executed by the micro-controller. Therefore, reference to a "module," in one embodiment, refers to the hardware, which is specifically configured to recognize and/or execute the code to be held on a non-transitory medium. Furthermore, in another embodiment, use of a "module" refers to the non-transitory medium including the code, which is specifically adapted to be executed by the microcontroller to perform predetermined operations. And as can be inferred, in yet another embodiment, the term "module" (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term "logic" includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of "to," "capable of/to," or "operable to," in one embodiment, refers to the latent state of an apparatus, logic, hardware, and/or element, where the apparatus, logic, hardware, and/or element is not operating but is designed in such a manner to enable use of an apparatus in a specified manner.

A "value," as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example the decimal number ten may also be represented as a binary value of 1010 and a hexadecimal letter A. Therefore, a "value" includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

As described with respect to FIG. 6, the embodiments of methods, hardware, software, firmware or code set forth above may be implemented via instructions or code stored on a machine-accessible, machine-readable, computer-accessible, or computer-readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals), and the like, which are to be distinguished from the non-transitory mediums that may receive information there from.

Instructions used to program logic to perform embodiments of the techniques may be hard coded within circuitry in each of the units described. Further, the logic may be stored within a memory in the system, such as a microcontroller memory, a DRAM, a cache, a flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

What is claimed is:

1. A system platform for communication with a service provider, comprising:
   a receiver to receive data from a communicatively coupled device;
   a controller having logic, at least partially comprising hardware logic, to configure communications channels comprising:
      a communication channel for transmission between the system platform and the service provider to receive the data;
      a communication channel for transmission between the system platform and the coupled device;
      wherein the communication channels are configured based on a context, comprising:
      characteristics of the coupled device;
      content of the data; and
      security requirements associated with the service provider;
   the controller comprising a channel detection engine configured to determine a type of communication technology to use for the communication channel for transmission between the system platform and the coupled device based on capabilities of the coupled device as well as data indicating a temporal condition between the controller and the coupled device; and the controller further comprising an application manager configured to provide a local execution environment to the service provider, wherein a logical reference to the coupled device from a use case running in the execution environment is mapped to a reference comprising:
the data from the coupled device;
simulated data; or
any combination thereof.

2. The system platform of claim 1, wherein the system platform comprises a hub platform, and wherein the communicatively coupled device is one of a plurality of communicatively coupled devices communicatively coupled to the hub platform in a local area network domain.

3. The system platform of claim 2, the controller further comprising a domain manager configured to:
maintain addresses identifying the coupled devices in the domain;
store preferred communication protocols to communicate with each of the coupled devices;
configure the coupled devices;
report errors in the domain; or
any combination thereof.

4. The system platform of claim 1, further comprising a policy engine, wherein the configuration of the communication channels is based on a reference to the policy engine.

5. The system platform of claim 1, wherein the system platform is configured to interface with the service provider at a security level higher than a security level capability of the communicatively coupled device.

6. The system platform of claim 1, wherein the communications channels comprise at least one of a Bluetooth channel, a Bluetooth Low Energy (BLE) channel, a WiFi channel, or a wireless Universal Serial Bus (USB) channel, or any combinations thereof.

7. The system platform of claim 1, the controller further comprising a recommendation engine to generate communication channel configuration recommendations to be provided to:
the service provider;
the communicatively coupled device; or
any combination thereof.

8. The system platform of claim 1, wherein the temporal condition comprises a current expected latency.

9. A method for communication with a service provider, comprising:
receiving data at a system platform from a communicatively coupled device;
configuring communications channels comprising:
a communication channel for transmission between the system platform and the service provider to receive the data; and
a communication channel for transmission between the system platform and the coupled device;
wherein the communication channels are configured based on a context, comprising:
characteristics of the coupled device;
content of the data; and
security requirements associated with the service provider; and
determining a type of communication technology to use for the communication channel for transmission between the system platform and the coupled device based on capabilities of the coupled device as well as data indicating a temporal condition between the system platform and the coupled device; and providing a local execution environment to the service provider, wherein a logical reference to the coupled device from a use case running in the execution environment is mapped to a reference comprising:
the data from the coupled device;
simulated data; or
any combination thereof.

10. The method of claim 9, wherein the system platform comprises a hub platform, and wherein the communicatively coupled device is one of a plurality of communicatively coupled devices communicatively coupled to the hub platform in a local area network domain.

11. The method of claim 10, further comprising:
maintaining addresses identifying the coupled devices in the domain;
storing preferred communication protocols to communicate with each of the coupled devices;
configuring the coupled devices;
reporting errors in the domain; or
any combination thereof.

12. The method of claim 9, further wherein the configuration of the communication channels is based on a reference to a policy engine.

13. The method of claim 9, wherein the communication channel for transmission between the system platform and the service provider to receive the data requires a security level that is higher than a security level capability of the communicatively coupled device.

14. The method of claim 9, further comprising generating communication channel configuration recommendations to be provided to:
the service provider;
the communicatively coupled device; or
any combination thereof.

15. A tangible, non-transitory, machine-readable storage medium comprising code for communication with a service provider, the code being configured to direct a processor to:
receive data at a system platform from a communicatively coupled device;
configure communications channels comprising:
a communication channel for transmission between the system platform and the service provider to receive the data; and
a communication channel for transmission between the system platform and the coupled device;
wherein the communication channels are configured based on a context, comprising:
characteristics of the coupled device;
content of the data; and
security requirements associated with the service provider;
determine a type of communication technology to use for the communication channel for transmission between the system platform and the coupled device based on capabilities of the coupled device as well as data indicating a temporal condition between the system platform and the coupled device; and
provide a local execution environment to the service provider, wherein a logical reference to the coupled device from a use case running in the execution environment is mapped to a reference comprising:
the data from the coupled device;
simulated data; or
any combination thereof.

16. The tangible, non-transitory, machine-readable storage medium of claim 15, wherein the system platform is configured as a hub, and wherein the communicatively coupled device is one of a plurality of communicatively coupled devices communicatively coupled to the hub in a local area network domain.

17. The tangible, non-transitory, machine-readable storage medium of claim 16, comprising code to direct the processor to:
- maintain addresses identifying the coupled devices in the domain;
- store preferred communication protocols to communicate with each of the coupled devices;
- configure the coupled devices;
- report errors in the domain; or
- any combination thereof.

18. The tangible, non-transitory, machine-readable storage medium of claim 15, comprising code of the system platform configured to interface with the service provider at a security level higher than a security level capability of the communicatively coupled device.

* * * * *